United States Patent
You

(10) Patent No.: US 11,802,960 B2
(45) Date of Patent: Oct. 31, 2023

(54) PHASE CORRECTING APPARATUS AND METHOD OF TRANSMISSION SIGNAL OF VEHICLE RADAR, AND VEHICLE RADAR APPARATUS WITH THE SAME

(71) Applicant: HL KLemove Corp., Pyeongtaek (KR)

(72) Inventor: Kyung Jin You, Anyang (KR)

(73) Assignee: HL KLEMOVE CORP., Pyeongtaek (KR)

( * ) Notice: Subject to any disclaimer, the term of this patent is extended or adjusted under 35 U.S.C. 154(b) by 273 days.

(21) Appl. No.: 17/187,614

(22) Filed: Feb. 26, 2021

(65) Prior Publication Data
US 2021/0270961 A1   Sep. 2, 2021

(30) Foreign Application Priority Data
Feb. 28, 2020   (KR) .......................... 10-2020-0024969

(51) Int. Cl.
*G01S 13/931* (2020.01)
*G01S 13/84* (2006.01)
*G01S 7/02* (2006.01)

(52) U.S. Cl.
CPC ............ *G01S 13/931* (2013.01); *G01S 13/84* (2013.01); *G01S 7/027* (2021.05); *G01S 2013/9316* (2020.01); *G01S 2013/93272* (2020.01)

(58) Field of Classification Search
None
See application file for complete search history.

(56) References Cited

U.S. PATENT DOCUMENTS

| | | | | | |
|---|---|---|---|---|---|
| 4,359,779 | A | * | 11/1982 | Levine | H03B 23/00 342/201 |
| 4,539,565 | A | * | 9/1985 | Norsworthy | G01S 7/4008 342/128 |
| 4,968,968 | A | * | 11/1990 | Taylor | G01S 7/4008 342/174 |
| 5,557,241 | A | * | 9/1996 | Burke | H03B 23/00 327/132 |

(Continued)

OTHER PUBLICATIONS

V. S. Chernyak, "On the concept of MIMO radar," 2010 IEEE Radar Conference, Arlington, VA, USA, 2010, pp. 327-332, doi: 10.1109/RADAR.2010.5494601. (Year: 2010).*

*Primary Examiner* — Bernarr E Gregory
(74) *Attorney, Agent, or Firm* — Harvest IP Law, LLP

(57) ABSTRACT

The present disclosure relates to a phase correcting apparatus and method of the transmission signal of the vehicle radar apparatus and vehicle radar apparatus with the same. The present embodiments may provide, in the vehicle radar apparatus including the plurality of transmission channels for simultaneously transmitting transmission signals, the phase correcting apparatus and the vehicle radar apparatus for determining the phase adjustment value at the first transmission time based on a source transmission signal applied to the phase shifter included in each transmission channel and a distortion transmission signal extracted from the coupler included in each transmission channel, and compensating the phase of the target detection transmission signal transmitted at a subsequent second transmission time point based on the phase adjustment value. According to the present embodiments, it is possible to improve the quality of the radar reception signal and increase the accuracy of the target information.

16 Claims, 11 Drawing Sheets

(56) References Cited

U.S. PATENT DOCUMENTS

| | | | | |
|---|---|---|---|---|
| 5,579,010 | A * | 11/1996 | Iihoshi | G01S 13/48 342/115 |
| 7,433,421 | B2 * | 10/2008 | Shako | H04L 27/368 375/296 |
| 9,097,791 | B2 * | 8/2015 | Kishigami | G01S 7/35 |
| 2005/0047521 | A1 * | 3/2005 | Ishikawa | H03F 1/3247 375/296 |
| 2007/0210955 | A1 * | 9/2007 | McEwan | G01S 7/4021 342/174 |
| 2018/0143296 | A1 * | 5/2018 | Lee | G01S 7/35 |

* cited by examiner

PHASE CORRECTING APPARATUS AND METHOD OF TRANSMISSION SIGNAL OF VEHICLE RADAR, AND VEHICLE RADAR APPARATUS WITH THE SAME

CROSS REFERENCE TO RELATED APPLICATION

This application claims priority from Republic of Korea Patent Application No. 10-2020-0024969, filed on Feb. 28, 2020, which is hereby incorporated by reference for all purposes as if fully set forth herein.

BACKGROUND OF THE INVENTION

An embodiment of the present disclosure relates to an vehicle radar apparatus and a controlling method thereof. In more detail, the embodiment of the present disclosure relates to a phase correcting apparatus and method of the transmission signal of the vehicle radar and vehicle radar apparatus capable of improving the signal quality by dynamically correcting the phase deviation for the transmission signal of a plurality of transmission channels in the vehicle radar.

A radar apparatus mounted in a vehicle or the like is widely used as a sensor device for vehicle control. The radar apparatus may transmit electromagnetic waves having a predetermined frequency, receive a signal reflected from an object, and process the received signal so as to extract the position of the object, speed information, or the like.

The target information acquired by the vehicle radar may include location information including distance information and angle information, and relative speed information between the host vehicle and the target.

The vehicle radar may include an antenna unit, a signal transmission/reception unit, a signal processing unit, and the like, and the signal transmission/reception unit and the signal processing unit may be implemented as a kind of digital signal processor chip.

The vehicle radar may include a plurality of transmission antennas or a plurality of transmission channels in order to vary a detection range or improve measurement accuracy.

In a radar apparatus having such multiple transmission channels, it is necessary to transmit the same transmission signal in the plurality of transmission channels at the same time.

In this case, the transmission signals transmitted simultaneously from the plurality of transmission channels are required to have exactly the same phase to improve the quality of the receiving signal, and thus to acquire the accurate target angle information.

However, depending on the physical properties of the radar device, the temperature of elements constituting the radar device, and the difference in physical characteristics of the transmission antenna, the phases of the transmission signals of the plurality of transmission channels may have a slight difference at each transmission time point.

Due to the phase difference of the simultaneous transmission signal, the quality of the receiving signal may be deteriorated, and the accuracy of the target information may decrease accordingly.

Therefore, it has been developed the method of correcting the phase of a transmission signal by setting a fixed phase adjustment value for the plurality of transmission channels for each radar device.

However, the method of using the fixed phase adjustment value may not be suitable for dynamic environment changes such as temperature change of elements of the radar device and temporal changes in physical properties of elements constituting the radar device.

Accordingly, there is a need for a method of dynamically correcting the phase distortion of the simultaneous transmission signal due to temperature change, physical property change, etc. in a vehicle radar device.

SUMMARY OF THE INVENTION

In this background, an aspect of the present disclosure is to provide an apparatus and method for correcting the transmission signal of radar apparatus.

Another aspect of the present disclosure is to provide an apparatus and method for phase correcting the transmission signal of the vehicle radar capable of improving the signal quality and the accuracy of the target information by removing the phase deviation of the simultaneous transmission signal in a vehicle radar apparatus which simultaneously transmits the same transmission signal in multiple transmission channels.

Another aspect of the present disclosure is to provide, in the vehicle radar apparatus including the plurality of transmission channels for simultaneously transmitting transmission signals, an apparatus and method for determining the phase adjustment value based on a source transmission signal and a distortion transmission signal for each transmission channel, and then correcting the phase of the target detection transmission signal at the next time point.

Another aspect of the present disclosure is to provide, in the vehicle radar apparatus including the plurality of transmission channels for simultaneously transmitting transmission signals, a radar apparatus for determining the phase adjustment value based on a source transmission signal applied to the phase shifter included in each transmission channel and a distortion transmission signal extracted from the coupler included in each transmission channel, applying the determined phase adjustment value to the phase shifter, and compensating the phase of the target detection transmission signal transmitted at a subsequent second transmission time point based on the phase adjustment value.

In accordance with an aspect of the present disclosure, there is provided with a phase correcting apparatus of a transmission signal included in a vehicle radar apparatus including a plurality of transmission channels for simultaneously transmitting the transmission signal comprising: a source transmission signal extractor for extracting a source transmission signal which is as a reference at a first transmission time; a distortion transmission signal extractor for extracting a distortion transmission signal with a phase distortion at the first transmission time; a phase adjustment value determiner for determining a phase adjustment value based on the source transmission signal and the distortion transmission signal at the first transmission time; and a phase corrector for correcting a phase of a target detection transmission signal using the phase adjustment value at a second transmission time following the first transmission time.

In this case, the source transmission signal may be an unmodulated signal, and the target detection transmission signal may be a frequency modulated signal.

In addition, the phase adjustment value determiner may calculate a phase representative value based on the phase of the source transmission signal and the phase of the distortion transmission signal, and may determine the phase representative value as the phase adjustment value.

In this case, the first transmission time may include a plurality of first subtransmission times, and the phase adjustment value determiner may determine an average of a difference between the phase of the source transmission signal and the phase of the distortion transmission signal calculated at the plurality of first subtransmission times as the phase representative value.

In addition, the source transmission signal extractor may extract the source transmission signal from an input signal of a phase shifter included in each transmission channel of the vehicle radar apparatus, and the distortion transmission signal extractor may extract the distortion transmission signal from a coupler included in each transmission channel of the vehicle radar apparatus.

In accordance with another aspect of the present disclosure, there is provided a vehicle radar apparatus comprising: a transmitter including a plurality of transmission channels for simultaneously transmitting a same transmission signal; a receiver including a receiving antenna for receiving a reception signal reflected from a target; a signal processor for processing the reception signal received from the receiving antenna to acquire target information; and a transmission signal phase correcting apparatus for correcting a phase of a target detection transmission signal at a second transmission time by determining a phase adjustment value based on a source transmission signal and a distortion transmission signal which are extracted at a first transmission time for each transmission channel included in the plurality of transmission channels.

In this case, each transmission channel included in the plurality of transmission channels may include a phase shifter, a coupler, and a transmission antenna, and the transmission signal phase correcting apparatus may extract the source transmission signal from an input signal of the phase shifter, and may extract the distortion transmission signal from the coupler.

In this case, the transmitter may include two or more transmission antennas that are spaced apart by a predetermined horizontal distance in the horizontal direction.

In accordance with another aspect of the present disclosure, there is provided a phase correcting methods of a transmission signal in a vehicle radar apparatus including a plurality of transmission channels for simultaneously transmitting the transmission signal comprising: extracting a source transmission signal which is as a reference at a first transmission time; extracting a distortion transmission signal with a phase distortion at the first transmission time; determining a phase adjustment value based on the source transmission signal and the distortion transmission signal at the first transmission time; and correcting a phase of a target detection transmission signal using the phase adjustment value at a second transmission time following the first transmission time.

As described below, according to embodiments of the disclosure, it is possible to properly compensate the phase of the radar transmission signal.

More specifically, according to embodiments of the disclosure, it is possible to improve the quality of the received signal and improve the accuracy of the target information by removing the phase deviation of the transmission signal in a vehicle radar apparatus simultaneously transmitting transmission signals in a plurality of transmission channels.

In addition, according to embodiments of the disclosure, in a vehicle radar apparatus including a plurality of transmission channels simultaneously transmitting transmission signals, it is possible to determine the phase adjustment value based on the source transmission signal and the distortion transmission signal for each transmission channel, and appropriately compensate the phase of the target detection transmission signal at the next time point.

DETAILED DESCRIPTION OF THE EXEMPLARY EMBODIMENTS

Figure 1:
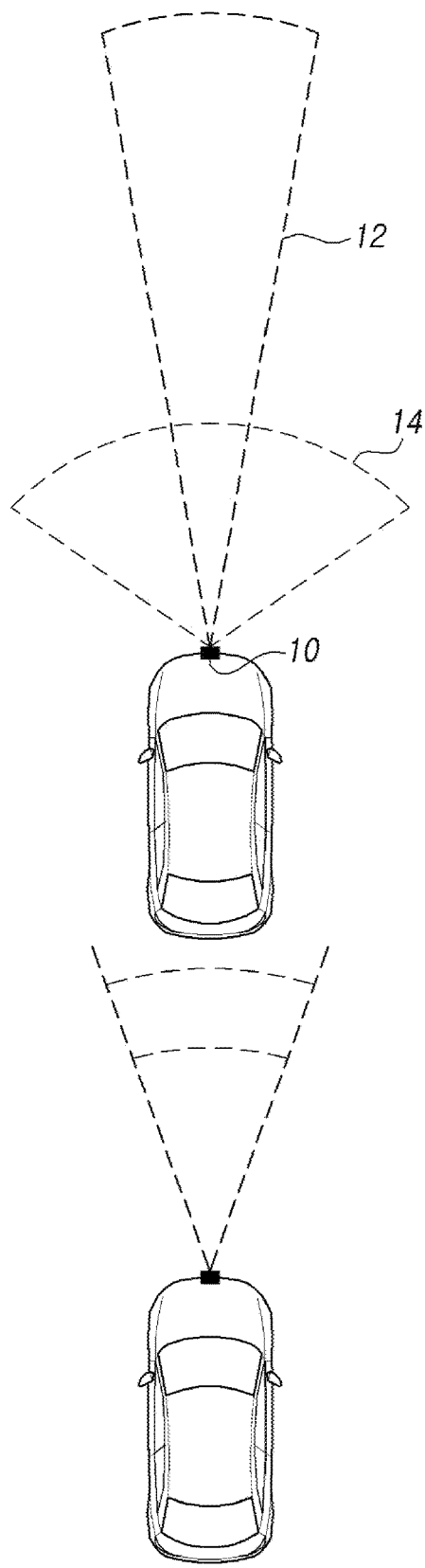
FIG. 1 illustrates an object detection method of a general vehicle radar sensor, and illustrates a medium/long-range detection area and a short-range detection area.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element.

The functional blocks illustrated in the drawings and described below are only examples of possible implementations. Other functional blocks may be used in other implementations without departing from the spirit and scope of the detailed description. Also, while one or more functional blocks of the present disclosure are represented by separate blocks, one or more of the functional blocks may be a combination of various hardware and software configurations that perform the same function.

Also, "a module," "a unit," or "a part" in the disclosure performs at least one function or operation, and these elements may be implemented as hardware, such as a processor or integrated circuit, software that is executed by a processor, or a combination thereof. Further, a plurality of "modules," a plurality of "units," or a plurality of "parts" may be integrated into at least one module or chip and may be implemented as at least one processor except for "modules," "units" or "parts" that should be implemented in a specific hardware.

FIG. 1 illustrates an object detection method of a general vehicle radar sensor, and illustrates a medium/long-range detection area and a short-range detection area.

As shown in FIG. 1, the vehicle radar sensor is required to have both a medium/long-range detection function for detecting a long-range target in front and a short-range detection function for detecting a short-range target near the vehicle when detecting an object in the vicinity of the vehicle.

In vehicles using radar sensors, various types of driver assistance systems (DAS) may be used to assist the driver's driving.

In an adaptive cruise system (ACC) for following the preceding vehicle, it is necessary to detect a mid-to-long-range target in front of the vehicle traveling direction.

Meanwhile, in the automatic emergency braking system (AEB) or an automatic emergency steering system (AES) that for urgently braking or steering the vehicle when there is an obstacle in front, or in the lane changing assistance (LCA) system for preventing collisions with obstacles in adjacent lanes when changing lanes, it is necessary to detect near-field obstacles near the vehicle with high precision.

That is, the vehicle radar apparatus is required to measure target information such as distance, speed, and angle information of various targets in a wide range with high precision.

In particular, in a general two-dimensional road driving environment, it is necessary to accurately measure the lateral position information of the target including the distance and the horizontal angle of the target rather than vertical information.

To this end, as shown in the upper drawing of FIG. 1, the vehicle radar apparatus 10 may have a long-range detection area 12 having a relatively narrow detection angle and a long detection distance for mid-to-long-range sensing, and a wide sensing angle and a short-range detection area 14 having a wide detection angle and a small detection distance.

Such a radar apparatus for a vehicle may be required to transmit the transmission signal in a mid-to-long-range transmission beam pattern for mid-to-long-range detection, and to transmit the transmission signal in a short-range transmission beam pattern different from a medium-to-long range transmission beam pattern for short-range detection.

However, since such a radar apparatus is required to include an antenna structure and a signal processing unit of two modes according to the detection range, the structure of the radar apparatus may be complicated, and a load of the signal processing operation may increase.

In order to solve this problem, it is necessary to integrate medium/long-range radar and short-range radar in vehicle radar. In addition, in order to integrate medium/long-range radar and short-range radar, it may be considered the manner using transmission antenna for each mode and common receiving antenna.

That is, as shown in the lower figure of FIG. 1, a radar apparatus having a single detection area is provided, however, by implementing different horizontal information distance resolutions according to the distance of the target, it is possible to provide a radar apparatus with a simple structure and the improved accuracy of the target horizontal information.

In addition, the vehicle radar may provide vertical direction information such as an elevation angle of an object in addition to the distance, speed, and horizontal angle of the target.

In order to estimate the elevation angle, the power of target signals received from different transmission/receiving antennas may be used, or an array antenna in a vertical direction may be used.

Meanwhile, in order to accurately detect the horizontal and vertical information of the target, the vehicle radar apparatus may have a structure which simultaneously transmits the same type of transmission signal through multiple transmission antennas or multiple transmission channels, and receives the reception signal reflected from the target from one or more receiving antennas.

Figure 2:
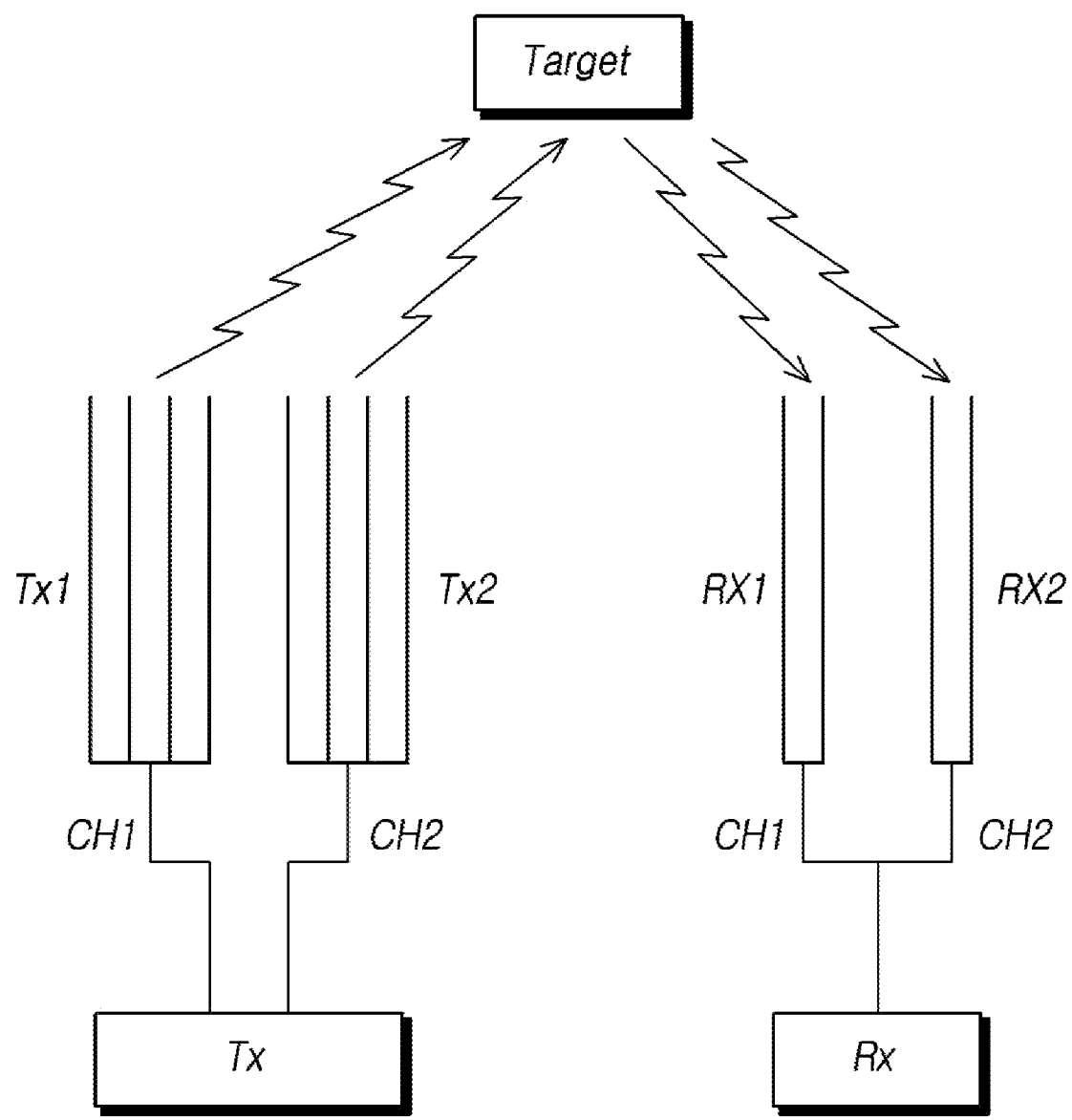
FIG. 2 illustrates an example of a transmission/reception channel of a vehicle radar apparatus in which the phase correcting apparatus according to the present embodiment can be used.

FIG. 2 illustrates an example of a transmission/reception channel of a vehicle radar apparatus in which the phase correcting apparatus according to the present embodiment can be used.

The vehicle radar apparatus of FIG. 2 may include two transmission antenna Tx1 and Tx2, and the transmitter Tx for controlling the transmission of the transmission signal. The path for transmitting the transmission signals to each transmission antenna may be defined as transmission channels CH1 and CH2.

The vehicle radar apparatus may simultaneously transmit the same type of transmission signal through two transmission channels CH1 and CH2, and the reception signal reflected from the target may be received through the two receiving antennas Rx1 and Rx2.

Similarly, the vehicle radar apparatus may include two receiving antennas Rx1 and Rx2 and a receiver Rx for controlling receiving the reception signal, and a path for receiving the reception signal through each receiving antenna may be defined as receiving channels CH1 and CH2.

In a radar apparatus having such multiple transmission channels, the same transmission signal can be transmitted in multiple transmission channels at the same time.

In this case, in order to improve the quality of the reception signal and acquire accurate target angle information, the transmission signals is required to have completely the same phase.

However, the phase of the transmission signal transmitted through a plurality of transmission channels may have a slight difference at each transmission time depending on the operating environment such as physical properties of the radar apparatus, temperature of elements constituting the radar apparatus, and differences in physical characteristics of the transmission antenna.

Due to the phase difference of the transmission signal, the quality of the reception signal may be deteriorated, and the accuracy of the target information may be reduced accordingly.

As a method of preventing performance degradation due to such a phase difference, it is possible to correct the phase of the transmission signal by setting a fixed phase adjustment value for a plurality of transmission channels for each radar apparatus.

However, the manner using the fixed phase adjustment value may be appropriate for compensating the signal according to the initial design of the radar apparatus, but it may not possible to adequately cope with changes in dynamic environments such as temperature changes of radar apparatus elements and temporal changes in physical properties of elements constituting radar apparatus.

Therefore, in the vehicle radar apparatus, there is a need for a method of dynamically correcting the phase distortion of the simultaneous transmission signal due to the temperature change and the change in physical properties.

Accordingly, the present embodiment proposes, in a vehicle radar apparatus including a plurality of transmission channels, a manner of dynamically determining the phase adjustment value based on the source transmission signal and the distortion transmission signal for each transmission channel, and appropriately compensating the phase of the target detection transmission signal at the next time based on the phase adjustment value.

Figure 3:
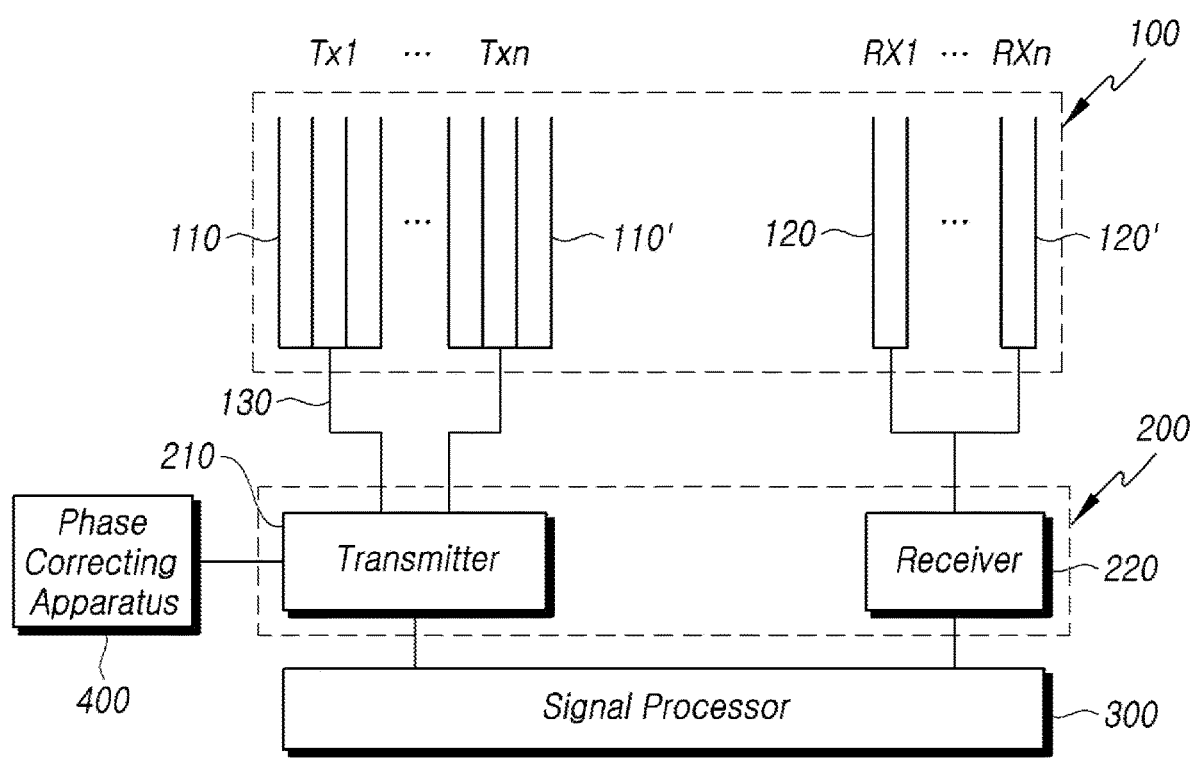
FIG. 3 illustrates a configuration of the vehicle radar apparatus according to the present embodiment.
Figure 4:
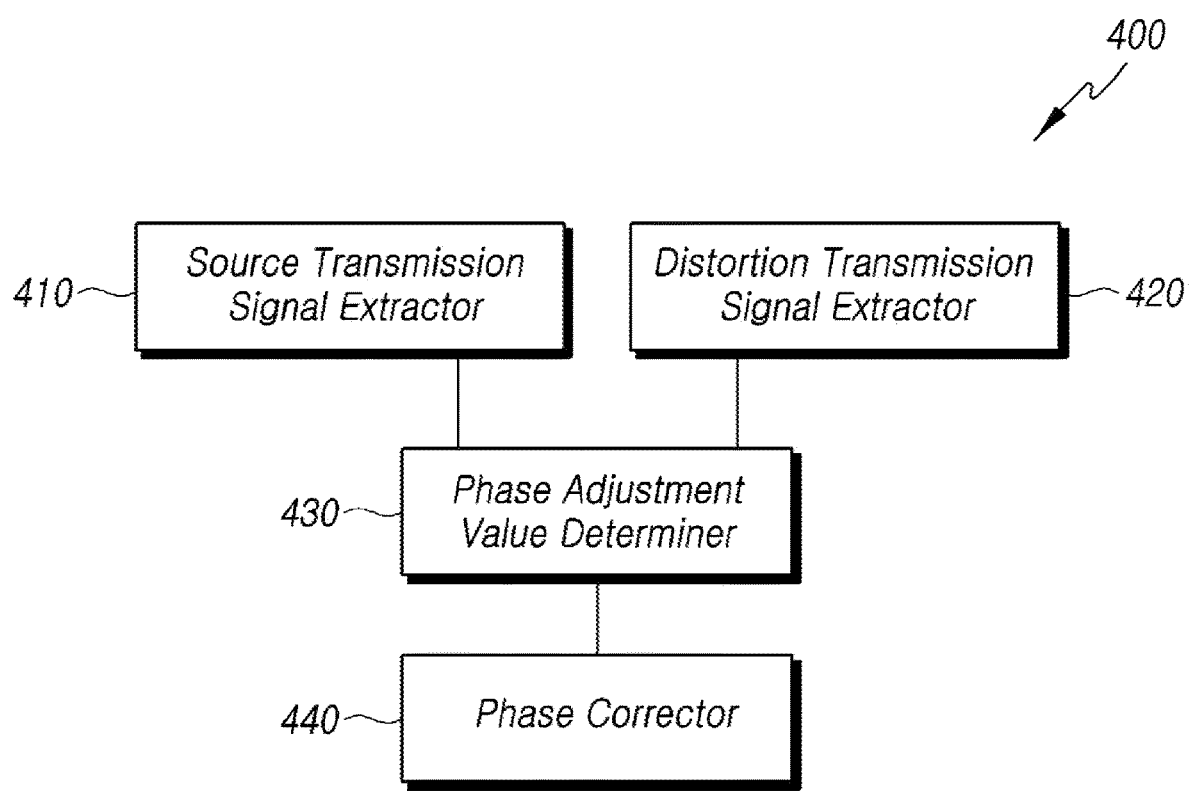
FIG. 4 is a block diagram for each function of the phase correcting apparatus according to the present embodiment.

FIG. 3 illustrates a configuration of the vehicle radar apparatus according to the present embodiment, and FIG. 4 is a block diagram for each function of the phase correcting apparatus according to the present embodiment.

The vehicle radar apparatus according to the present embodiment may include the antenna unit 100, the signal transmission/reception unit 200, the signal processing unit 300, and the phase correcting apparatus 400 according to the present embodiment.

For example, the antenna unit 100 may include two or more transmission antennas 110 and 110' for transmitting the transmission signal around the vehicle and a receiving antenna 120 for receiving the reception signal reflected from an object.

In addition, it may be further provided with a divider or coupler 130, which is a signal line connecting a chip constituting the transmission/reception unit 200 and the signal processing unit 300, and a transmission antenna and a receiving antenna.

As will be described in more detail in FIG. 5, the divider or coupler 130 may be provided for each transmission channel, and may perform a function of controlling the power, phase, and the like of the transmission signal transmitted to each transmission antenna.

More specifically, the divider or coupler may further include a phase shifter for adjusting the phase of the transmission signal.

According to the present embodiment, one of the transmission antenna and the receiving antenna included in the antenna unit 100 may be configured to include two or more array antennas spaced apart (horizontal offset or vertical offset) by a predetermined distance in the horizontal direction or the vertical direction.

In particular, the radar apparatus according to the present embodiment may include two or more transmission antennas simultaneously transmitting the same transmission signal. It will be described a detailed configuration of the transmission antaean below with reference to FIGS. 8 and 9.

Meanwhile, the transmission/reception unit 200 of the radar apparatus according to the present embodiment may control to transmit the transmission signal of a specific operating frequency band and receive the reception signal through the receiving antenna.

The transmission/reception unit 200 may include a transmission unit 210 or a transmitter for controlling transmission of the transmission signal, and a reception unit 220 or a receiver for controlling reception of the reception signal.

The transmission unit 210 of the radar apparatus according to the present embodiment may include a plurality of transmission channels simultaneously transmitting the same transmission signal.

In addition, the reception unit 220 according to the present embodiment may include the receiving antenna for receiving the reception signal reflected from the target.

The phase correcting apparatus 400 according to the present embodiment may be linked with each transmission channel constituting the plurality of transmission channels, and may determine the phase adjustment value based on the source transmission signal and the distortion transmission signal extracted at the first transmission time for each transmission channel. Then, the phase correcting apparatus may perform function of correcting the phase of the target detection transmission signal at the second transmission time using the determined phase adjustment value.

It will be described the detailed configuration of the phase correcting apparatus 400 according to the present embodiment below based on FIGS. 4 and 5.

The signal processing unit 300 may control the signal transmission/reception unit 200 to simultaneously transmit the transmission signal having a specific transmission beam pattern through the transmission antenna, and may process the reception signal received from the receiving antenna to acquire object information.

The signal processing unit 300 may be expressed in other terms such as a control unit and a signal processor, and may be implemented in the form of a digital signal processor (DSP)

Meanwhile, the radar sensor apparatus may be classified into a pulse type, a frequency modulation continuous wave (FMCW) type, and a frequency shift keying (FSK) type according to the signal type.

Among them, the FMCW type radar apparatus may use a chirp signal or a ramp signal, which is a signal whose frequency increases with time, and may determine the object's information by using time difference between the transmission wave and the reception wave and the doppler frequency shift.

More specifically, the controller of the radar apparatus may include the signal transmitter/receiver 200 for controlling signal transmission/reception through a transmission/ receiving antenna, and the signal processor 300 for calculating target information (position, distance, angle, etc.) by using the transmission signal and the reflected signal received from the receiving antenna.

The signal transmitter/receiver 200 may include the transmitter 210 and the receiver 220, and the transmitter 210 may include an oscillator for supplying a signal to each transmission antenna to generate a transmission signal. The oscillator may include, for example, a voltage-controlled oscillator (VCO).

In addition, the transmitter 210 may further include the phase shifter and the coupler disposed in a path between each transmission antenna and the signal processor 300, and the phase correcting apparatus 400 according to the present embodiment may operate in conjunction with the phase shifter and the coupler included in each transmission channel.

It will be described the detailed configurations of the transmitter 210 and the phase correcting apparatus 400 below with reference to FIG. 5.

The receiver 220 included in the signal transmitter/receiver 200 may include a low noise amplifier (LNA) for low-noise amplification of the reflection signal received through the receiving antenna, and a mixer for mixing the low-noise amplified reception signal, an amplifier for amplifying the mixed reception signal, and an analog digital converter (ADC) for generating reception data by digitally converting the amplified reception signal.

The signal processor 300 may include a first processor and a second processor. The first processor, as a pre-processor for the second processor, may acquire the transmission data and reception data, control the generation of the transmission signal in the oscillator based on the acquired transmission data, synchronize transmission data and reception data, and perform the frequency-conversion of the transmission data and reception data.

The second processor is a post-processor that performs actual processing using the processing result of the first processor. The second processor may perform a CFAR (Constant False Alarm Rate) calculations, tracking calculations, target selection calculations based on the received data frequency converted by the first processing unit so as to extract angle information, speed information, and distance information for a target. However, the present disclosure is not limited thereto, and if information on a target can be extracted, the technical idea according to the present disclosure may be applied.

The first processor may perform frequency conversion after data buffering the acquired transmission data and the acquired reception data in a unit sample size that can be processed per cycle. The frequency conversion performed by the above-described first processor may be implemented by using a Fourier transform such as a Fast Fourier Transform (FFT).

The second processor may perform a second Fourier transform on a first Fourier transform (FFT) signal performed by the first processor, and the second Fourier transform may be, for example, a Discrete Fourier Transform (DFT), in particular, a chirp-discrete Fourier transform (Chirp-DFT).

The second processor may acquire frequency values corresponding to the number of times corresponding to the second Fourier transform length K through the second Fourier transform such as Chirp-DFT. The second processor may detect an object by calculating the beat frequency with the greatest power during each chirp period based on the obtained frequency value, and obtaining speed information and distance information of the object based on the calculated beat frequency.

The principle of obtaining target information by the signal processing unit will be described in more detail below with reference to FIG. 7.

The phase correcting apparatus 400 according to the present embodiment may be implemented as an apparatus linked to the transmitter transmitting the transmission signal through the transmission antenna of the radar apparatus.

That is, the phase correcting apparatus 400 according to the present embodiment may be provided for each transmission channel of the plurality of transmission channels simultaneously transmitting transmission signals.

As illustrated in FIG. 4, the phase correcting apparatus 400 according to the present embodiment may include the source transmission signal extractor 410, the distortion transmission signal extractor 420, and the phase adjustment value determiner 430, and the phase corrector 440.

For example, the source transmission signal extractor 410 of the phase correcting apparatus 400 may perform a function of extracting a reference source transmission signal at a first transmission time t1.

More specifically, the source transmission signal extractor 410 may obtain the source transmission signal input to the phase shifter constituting the transmission unit of each transmission channel.

In the present disclosure, the source transmission signal Ss may be defined as an initial transmission signal or a reference transmission signal generated by the control of the transmission/reception unit 200 and applied to each transmission channel.

In addition, the source transmission signal Ss according to the present embodiment is a dedicated transmission signal used for phase correction of the transmission signal, and may be a signal different from the target detection transmission signal St, which is a transmission signal used by the radar for target detection.

Meanwhile, the distortion transmission signal extractor 420 of the phase correcting apparatus 400 may perform a function of extracting the distortion transmission signal with the phase distortion at the first transmission time t1.

As an example, the distortion transmission signal extractor 420 may obtain the distortion transmission signal from the coupler constituting the transmission unit of each transmission channel.

In this disclosure, the distortion transmission signal Sd may be defined as a transmission signal immediately before being transmitted from the corresponding transmission antenna after passing through the transmission path such as the coupler in each transmission channel.

In addition, the distortion transmission signal Sd according to the present embodiment may be a dedicated transmission signal used for phase correction of the transmission signal, and may be a signal different from the target detection transmission signal St, which is a transmission signal used by the radar apparatus for target detection.

In an ideal condition in which transmission signal distortion does not occur for each transmission channel, the source transmission signal Ss and the distortion transmission signal Sd may be the same signal having the same amplitude, frequency, and phase.

However, due to dynamic environmental changes such as temperature change of the radar apparatus element and temporal changes in properties of the elements constituting the radar apparatus, a specific signal distortion may occur between the source transmission signal Ss and the distortion transmission signal Sd.

Meanwhile, when acquiring the target information by processing the transmission signal and the reception signal, angle information of the target may be obtained using the phase of the transmission signal and the reception signal.

Therefore, in the case that a slight difference occurs in the phase of the transmission signal simultaneously transmitted in multiple transmission channels due to the change in the dynamic environment, the quality of the reception signal may deteriorate, and the accuracy of the target angle information may decrease accordingly.

Accordingly, the present embodiments operates to match the phases of transmission signals simultaneously transmitted in the plurality of transmission channels by using the phase correcting apparatus 400 provided for each transmission channel.

For example, the source transmission signal extractor 410 may extract the source transmission signal from an input signal of the phase shifter included in each transmission channel of the radar apparatus. In addition, the distortion transmission signal extractor 420 may extract the distortion transmission signal from the coupler included in each transmission channel of the radar apparatus.

The phase adjustment value determiner 430 of the phase correcting apparatus 400 according to the present embodiment may perform the function of calculating the phase adjustment value $\Delta\Phi$ based on the source transmission signal Ss and the distortion transmission signal Sd obtained at the first transmission time t1.

As an example, the phase adjustment value determiner 430 may calculate the phase representative value based on the phase of the acquired source transmission signal Ss and the phase of the distortion transmission signal Sd, and may determine the calculated phase representative value as the phase adjustment value.

In this case, the phase representative value may be a difference value between the phase of the source transmission signal Ss and the phase of the distortion transmission signal Sd measured instantaneously at a specific time point. In addition, the first transmission time may include a plurality of first subtransmission times in order to calculate an accurate phase adjustment value.

For example, the phase adjustment value determiner 430 may determine an average of the difference value between the phase of the source transmission signal and the phase of the distortion transmission signal calculated at a plurality of first subtransmission times as the phase representative value.

As another example, the phase adjustment value determiner 430 may calculate the phase representative value based on the phase of the source transmission signal Ss and the phase of the distortion transmission signal Sd acquired at a specific temperature, and may determine the calculated phase representative value as the phase adjustment value. For example, the phase adjustment value determine 430 may determine an average of the difference value between the phase of the source transmission signal and the phase of the distortion transmission signal calculated for each temperature as the representative phase value for each temperature.

As another example, the phase adjustment value determiner 430 may calculate the phase representative value based on the phase of the source transmission signal Ss and the phase of the distortion transmission signal Sd acquired when the transmission signal Ss is a signal of a specific frequency, and may determine the calculated phase representative value as the phase adjustment value. For example, the phase adjustment value determiner 430 may determine an average of the difference value between the phase of the source transmission signal and the phase of the distortion transmission signal calculated for each frequency of the transmission signal Ss as the representative phase value for each frequency.

Accordingly, the vehicle radar apparatus of the present embodiment may correct the phase distortion of the simultaneous transmission signal due to temperature change and physical property change by using the phase representative value for each temperature or the phase representative value for each frequency.

The phase corrector 440 of the phase correcting apparatus 400 according to the present embodiment may perform a function of correcting the phase of the target detection transmission signal St by using the phase adjustment value $\Delta\Phi$ at the second transmission time t2 following the first transmission time t1.

More specifically, the phase corrector 440 may set a phase shift value of the phase shifter included in the transmission unit of each transmission channel based on the calculated phase adjustment value $\Delta\Phi$, and may control to transmit the target detection transmission signal by applying the phase shift value.

In this case, the source transmission signal Ss may be an unmodulated signal, and the target detection transmission signal may be a frequency modulated signal.

As will be described with reference to FIG. 7, a target detection signal used for detecting the target in the radar apparatus may be a frequency modulated signal which changes a frequency according to time.

This frequency modulated signal changes in frequency over time, and this characteristic may interfere with measuring the amount of phase change of the transmission signal.

Accordingly, the present embodiment may utilize the source transmission signal Ss, which is an unmodulated signal in which the frequency modulation process is omitted, for the phase correction during the first transmission time t1 or during the first transmission period.

For example, the phase corrector 440 may calculate the phase shift value by comparing the phase of the source transmission signal and the distortion transmission signal using the unmodulated signal transmitted during a specific transmission period including the first transmission time.

Figure 5:
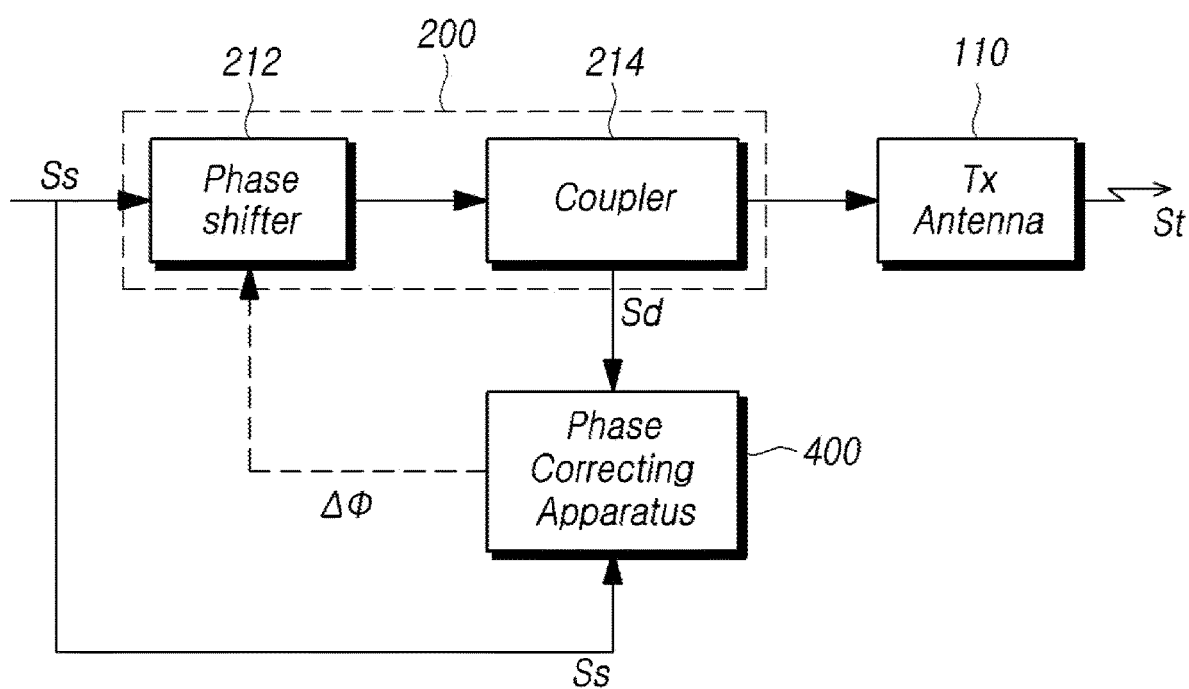
FIG. 5 illustrates a detailed configuration of the radar transmitter to which the phase correcting apparatus according to the present embodiment is applied.

FIG. 5 illustrates a detailed configuration of the radar transmitter to which the phase correcting apparatus according to the present embodiment is applied.

Specifically, FIG. 5 illustrates the transmission unit 210, the transmission antenna 110, and the phase correcting apparatus 400 with respect to the transmission channel CHi among the plurality of transmission channels.

As shown in FIG. 5, the radar apparatus according to the present embodiment includes the plurality of transmission channels or transmission antennas for simultaneously transmitting transmission signals. In addition, the transmission unit 210 of each transmission channel may include the phase shifter 212 and the coupler 214, and each transmission channel may include the corresponding transmission antenna 110.

For example, the phase shifter 212 may receive an initial transmission signal generated through an oscillator of the transmission unit, and adjust the phase of the transmission signal according to the preset phase shift value.

In addition, the coupler 214 may be defined as a signal path through which the transmission signal output from the phase shifter 212 is transmitted to the transmission antenna 110.

The phase shifter 212 or coupler 214 may be expressed as a divider.

The phase shifter 212 or the coupler 214 may function to supply the transmission signal having a specific power ratio and a specific phase ratio to each transmission channel (transmission antenna) constituting a plurality of transmission channel.

The phase shifter 212 or the coupler 214 according to the present embodiment may be implemented as a passive element by adjusting the line width, length, etc. of the feed line connecting each transmission antenna and the controller (specifically, the transmission unit of the signal transmission/reception unit).

As an example, the phase shifter 212 or coupler 214 may include the feed line provided from the controller of the radar apparatus to each transmission antenna. The phase shifter 212 or the coupler 214 may set the power ratio by varying the line width of the output feed line among these feed lines, or may set the phase ratio by varying the length of the feed line supplied to each transmission antenna.

However, according to this embodiment, since the phase of the transmission signal is required to be dynamically controlled, the phase shifter 212 or coupler 214 according to the present embodiment is desirable to be an active element configured in software using a control element such as a specific circuit.

Meanwhile, as shown in FIG. 5, the phase correcting apparatus 400 may be linked with the transmission unit or the transmitter of each transmission channel, more specifically, the phase shifter 212 and the coupler 214 included in the transmission unit of each transmission channel.

According to the present embodiment, the source transmission signal Ss may be applied to the phase shifter 212 constituting each transmission channel at the first transmission time t1, and at this time, the source transmission signal extractor 410 of the phase correcting apparatus 400 may acquire the source transmission signal Ss applied to the phase shifter 212.

In addition, the distortion transmission signal extractor 420 of the phase correcting apparatus 400 may acquire the distortion transmission signal Sd at the coupler 214 or at a position between the coupler 214 and the transmission antenna during the first transmission period including the first transmission time t1.

Subsequently, the phase adjustment value determiner 430 of the phase correcting apparatus 400 may measure a phase difference value between the acquired source transmission signal Ss and the distortion transmission signal Sd, and may determine the phase adjustment value ΔΦ based on the phase difference value.

The phase corrector 440 of the phase correcting apparatus 400 may adjust the phase shift value of the phase shifter 214 using the calculated phase adjustment value ΔΦ, and may control to transmit the target detection transmission signal St at the subsequent second transmission time t2.

Accordingly, the target detection transmission signal St transmitted at the second transmission time t2 may become a phase distortion-corrected signal, and the target detection transmission signal St having the same phase may be transmitted in all transmission channels.

Meanwhile, the transmitter of the radar apparatus according to the present embodiment may further include a voltage controlled oscillator (VCO), a power divider, and a power amplifier in addition to the phase shifter 212 and coupler 214 shown in FIG. 5.

The voltage controlled oscillator may perform a function of generating a sine wave of a specific frequency by control of a pulse modulation controller, and the power divider may perform switching and power distribution functions to the plurality of transmission antennas or receiving antennas.

In addition, the power amplifier may perform a function of amplifying the amplitude of the transmission wave transmitted through the transmission antenna.

Figure 6:
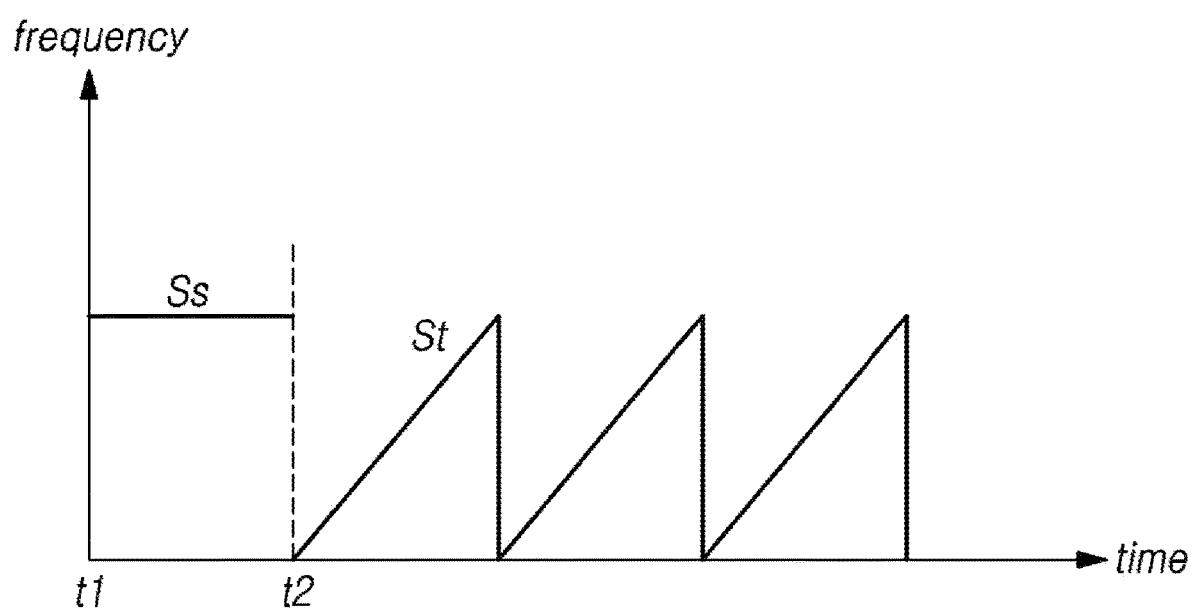
FIG. 6 illustrates an example of waveforms of the source transmission signal and the target detection transmission signal according to the present embodiment.

FIG. 6 illustrates an example of waveforms of the source transmission signal and the target detection transmission signal according to the present embodiment.

Referring to FIG. 6, the unmodulated signal, that is, the source transmission signal Ss having a constant frequency, may be transmitted during a predetermined first transmission period t2-t1 including the first transmission time t1.

In addition, the phase correcting apparatus 400 according to the present embodiment may reset the phase shift value of the phase shifter during a predetermined first transmission period (t2-t1) including the first transmission time t1 by using the phase adjustment value calculated based on the source transmission signal Ss and the distortion transmission signal Sd.

At the second transmission time t2 following the first transmission period, the target detection transmission signal St to which the adjusted phase shift value is applied may be transmitted.

In this case, the target detection transmission signal St may be a frequency modulated signal, more specifically, a frequency modulated continuous wave FMCW.

The signal processing unit 300 of the radar apparatus may acquire target information using the target detection transmission signal St and the reception signal received from the receiving antenna, which will be described in more detail with reference to FIG. 7.

Figure 7:
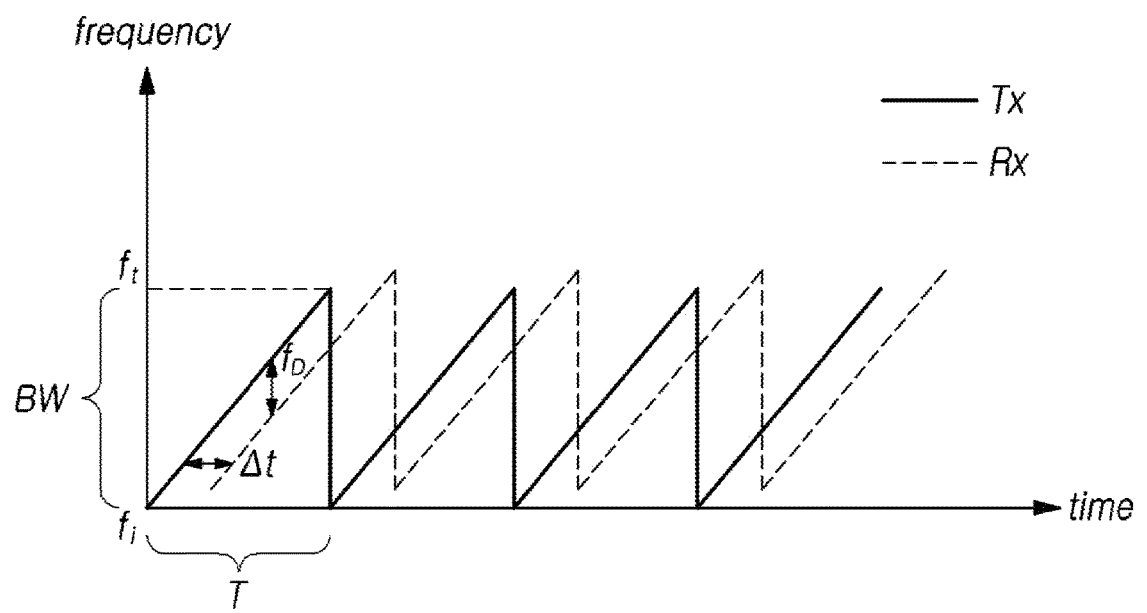
FIG. 7 illustrates an example of the target detection transmission signal of the radar apparatus according to the present embodiment, and illustrates an example of a frequency modulated continuous wave (FMCW) signal waveform and a distance detection principle using the same.
Figure 7:
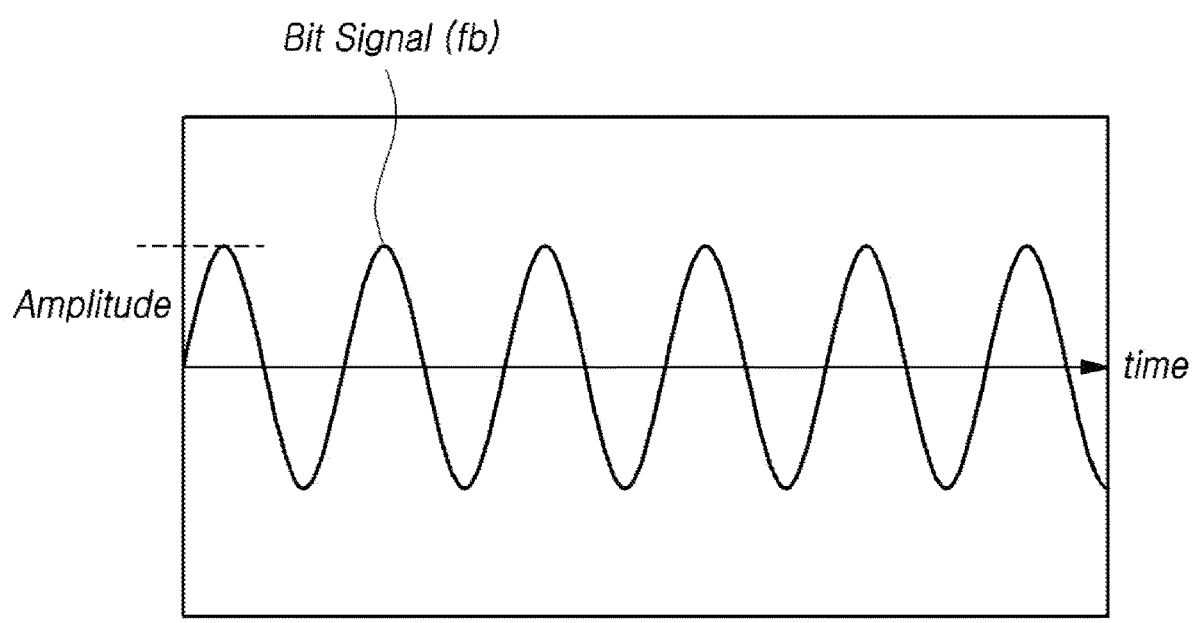

FIG. 7 illustrates an example of the target detection transmission signal of the radar apparatus according to the present embodiment, and illustrates an example of a frequency modulated continuous wave (FMCW) signal waveform and a distance detection principle using the same.

The signal modulation scheme for the FMCW radar can be implemented in several forms, the most representative of which is to use the sawtooth signal waveform as shown in FIG. 7.

That is, The FMCW radar may repeatedly generate and transmit up-chirp signals in which the frequency increases linearly from the start frequency fi to the end frequency ff during the sweep time or sweep repetition period T, which is a constant time period, and may receive the reception signal reflected from the object.

In this disclosure, the sweep time may be used in the same meaning as the modulation period.

In FIG. 7, the solid line represents the transmission waveform and the dotted line represents the reception waveform.

In this sawtooth signal model, one chirp signal has an individual frequency band BW, which is a difference (ff-fi) between the end frequency and the start frequency, and the start frequencies of all chirp signals are the same as fi.

As shown in FIG. 7, the transmission wave (solid line) and the reception wave (dotted line) have the same shape, but have specific shifts along the time axis and the frequency axis.

The distance and relative speed of the object may be calculated by using the time shift or frequency shift between the transmission wave and the reception wave.

More specifically, when the transmission wave and the reception wave are mixed (i.e., convoluted), the beat signal as shown in the lower figure of FIG. 6 is generated, and this bit signal is in the form of a sine wave having a specific bit frequency fb.

In this case, the bit frequency fb of the bit signal has a value proportional to the distance R to the object, and specifically, the distance R to the object may be determined as in Equation 1 below.

$$R = \frac{fb \cdot T \cdot c}{2 \cdot BW} \quad \text{[Equation 1]}$$

In Equation 1, BW denotes the individual frequency bandwidth of the chirp signal, T denotes the sweep time, c denotes the speed of light, and fb denotes the bit frequency of the bit signal.

As described above, in the sawtooth waveform model of FIG. 7, a distance to an object can be calculated by using a sawtooth shaped repetitive chirp signal, generating the beat signal by mixing the transmission wave and the reception wave, and then measuring the beat frequency.

The radar apparatus according to the present embodiment is not limited to the signal type, modulation method, and target information acquisition principle as shown in FIG. 7, and other methods may be used.

Figure 8:
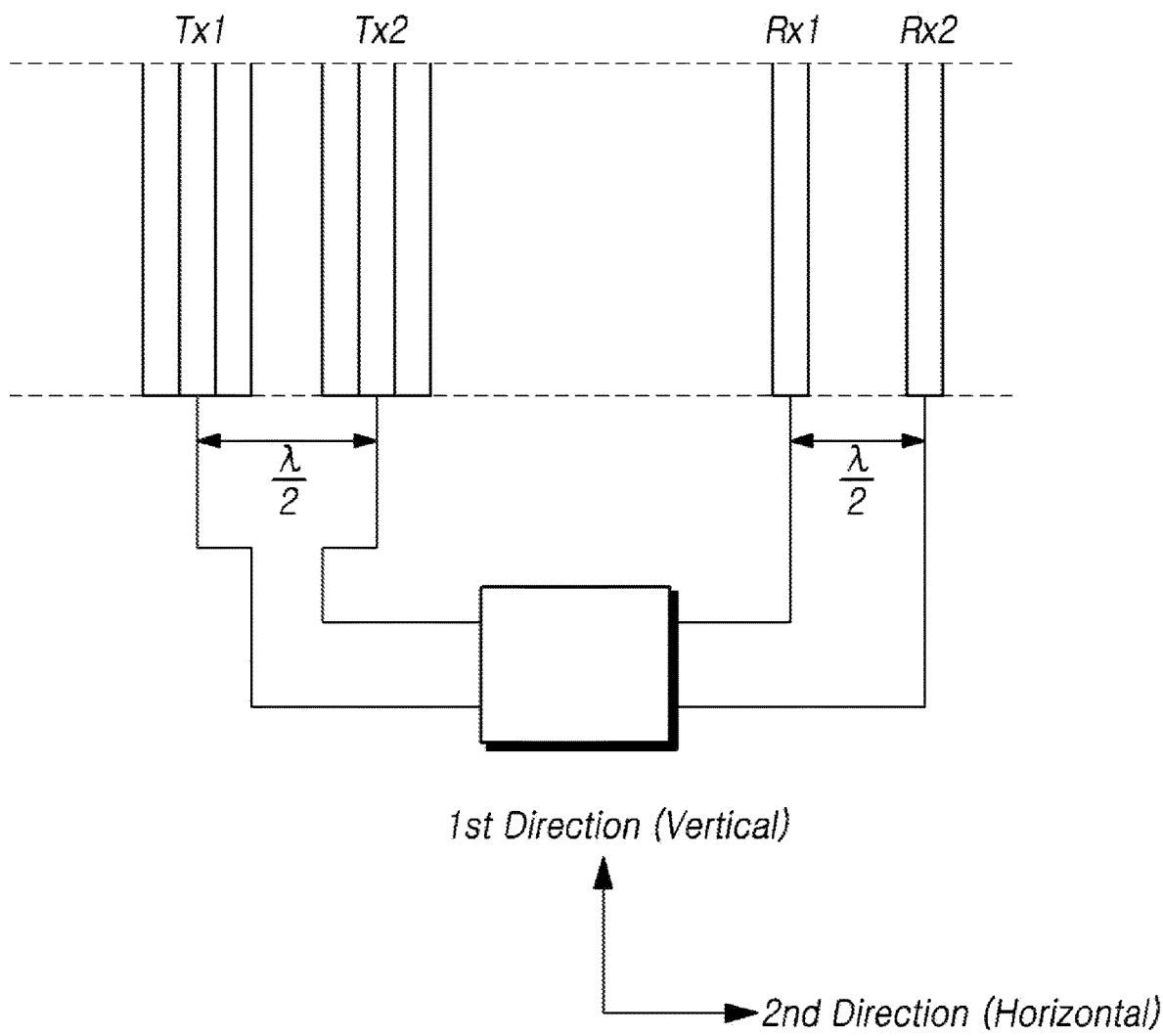
FIGS. 8 and 9 illustrate embodiments of the transmission antenna used in the radar apparatus according to the present embodiment.
Figure 9:
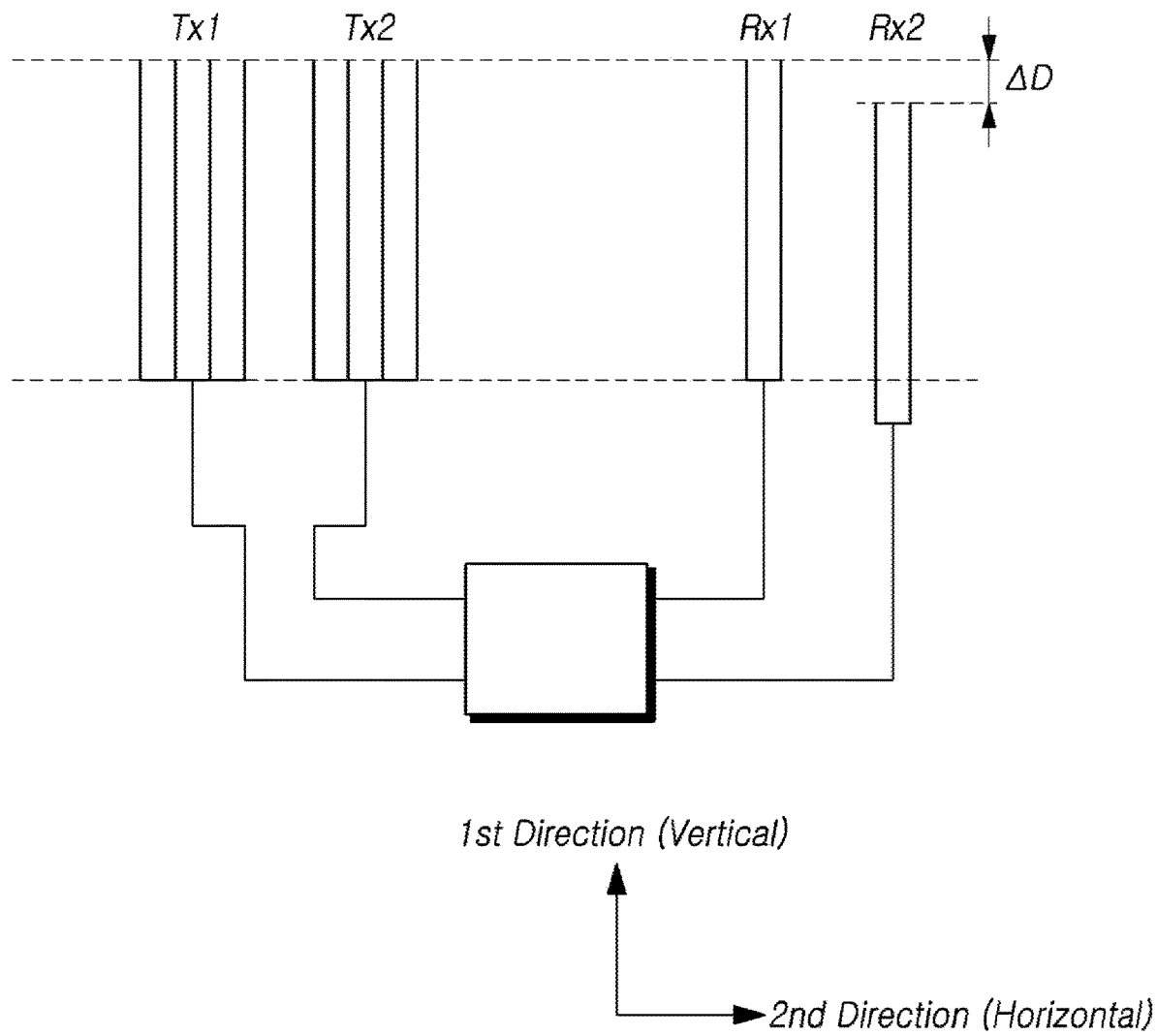

FIGS. 8 and 9 illustrate embodiments of the transmission antenna used in the radar apparatus according to the present embodiment.

As described above, the radar apparatus according to the present embodiment may include two or more transmission antennas simultaneously transmitting the same transmission signal.

As an example, as shown in FIG. 8, the antenna unit 100 may include two transmission antennas Tx1, Tx2 simultaneously transmitting the transmission signal and one or more receiving antennas Rx for receiving signals reflected from the target.

In addition, as shown in FIG. 8, the two transmission antennas Tx1 and Tx2 may be disposed at the same position in the vertical direction (first direction), and may be spaced apart by a predetermined distance in the horizontal direction (second direction). Furthermore, the plurality of receiving antennas Rx may be disposed at the same position in a vertical direction (first direction).

Each of the transmission antenna and the receiving antenna may have a structure in which 2, 4, or 6 array antennas extend to one direction while having one feed point, but is not limited thereto.

Each of the array antennas constituting the transmission antenna and receiving antennas may be composed of a plurality of elements or patches connected to the output line of the distributor, may extend in an upper direction (upper direction among the vertical directions) with a feed port connected to a chip including a controller or an input port of a distributor as a starting point.

For example, the two transmission antennas Tx1 and Tx2 constituting the transmission antenna unit may be arranged to be spaced apart by a half of the transmission signal wavelength 0.5λ in the horizontal direction (second direction) perpendicular to the vertical direction (first direction), which is the extension direction of each array antenna. In addition, the plurality of receiving antennas Rxi constituting the receiving antenna unit may also be arranged to be spaced apart by a half 0.5λ of the wavelength of the transmission signal.

In this way, by setting the horizontal distance between the transmission antenna or the receiving antenna as a half 0.5λ of the wavelength of the transmission signal, it is possible to remove the angle ambiguity caused by the grating lobe.

That is, the grating lobe may occur because the distance between the receiving antennas is more than half 0.5λ of the wavelength of the transmission signal. However, it is possible to minimize angle ambiguity due to the grating lobe by arranging the horizontal distance between the receiving antennas at 0.5λ, and comparing and compensating the angle information extracted from the channels of each receiving antenna.

In the antenna structure as shown in FIG. 8, the same transmission signal may be simultaneously transmitted from two transmission antennas Tx1 and Tx2, and reception signals may be received from one or more receiving antennas.

The distance to the target may be calculated using a time difference between the transmission time and the reception time, and horizontal angle information of the target may be calculated using the phase difference between the transmission signal and the reception signal.

In the embodiment of FIG. 9, the two transmission antennas Tx1 and Tx2 are disposed at the same position in the vertical direction (first direction), and may be disposed spaced apart by a predetermined distance in the horizontal direction (second direction). However, the plurality of receiving antennas Rx may be arranged to be spaced apart by a specific vertical distance ΔD in the vertical direction.

For example, as shown in FIG. 9, in the case that two receiving antennas Rx1 and Rx2 are vertically offset by a specific distance in the vertical direction, there may be a phase difference according to the vertical offset between the first reception signal received from Rx1 and the second reception signal received from Rx2.

Therefore, the distance to the target may be calculated using the time difference between the transmission time and the reception time, and the vertical information of the target may be calculated using the phase difference between the transmission signal, the first reception signal, and the second reception signal.

The antenna unit 100 used in the radar apparatus according to the present embodiment is not limited to the embodiments of FIGS. 8 and 9.

That is, it may be used another structure in which the antenna unit according to the present embodiment includes two or more transmission antennas for simultaneously transmitting the transmission signal and one or more receiving antennas for receiving the reception signal reflected from the target.

In addition, the radar apparatus according to the present embodiments can employ a signal transmission and reception technique based on a multidimensional antenna array and a multiple input multiple output (MIMO) in order to form a virtual antenna aperture greater than an actual antenna aperture.

For example, a two-dimensional antenna array can be employed to accomplish the accuracy of an angle to the vertical and/or the horizontal and a higher resolution. In case the two-dimensional radar antenna array is used, signals are transmitted and received by two separate scans (time multiplexed) horizontally and vertically, and the MIMO can be used separately from the horizontal and vertical scans (time multiplexed) by the two-dimensional antenna array.

More specifically, the radar apparatus according to one or more embodiments can comprise a two-dimensional antenna array including a transmission antenna assembly including a total of 12 transmission antennas Tx and a receiving antenna assembly including a total of 16 receiving antennas Rx; as a result, a total of 192 virtual receiving antennas can be arranged.

Further, in another embodiment, in a case where the antenna assembly of the radar sensor comprises the two-dimensional antenna array, each antenna patch can be disposed in a diamond or rhombus shape; therefore, unnecessary side lobes can be reduced.

Alternatively, the two-dimensional antenna arrangement can comprise a V-shape antenna array in which a plurality of radiating patches is arranged in a V-shape, and more specifically, comprise two V-shape antenna arrays. In this case, a single feed is performed to the apex of each V-shape antenna array.

Alternatively, the two-dimensional antenna arrangement can comprise a X-shape antenna array in which a plurality of radiating patches is arranged in a X-shape, and more specifically, comprise two X-shape antenna arrays. In this case, a single feed is performed to the center of each X-shape antenna array.

Further, the radar apparatus according to one or more embodiments can employ the MIMO antenna system to accomplish the accuracy of an angle to the vertical and/or the horizontal and a higher resolution.

More specifically, in the MIMO system, each transmission antenna can transmit a signal with a waveform independent of one another. That is, each transmission antenna can transmit a signal with a waveform independent of the other transmission antenna(s), and then each receiving antenna can determine which transmission antenna a received signal from an object is transmitted from due to the using of the independent waveform for each transmission antenna.

Further, the radar apparatus according to one or more embodiments can comprise a radar housing in which a substrate on which the antenna assembly is disposed and a circuitry are accommodated, and a radome served as an enclosure of the radar housing. The radome can be formed of a material capable of decreasing attenuation of radar signals transmitted and received, and constitute a front or rear bumper, a grille, or a side body of the vehicle, or an exterior surface of one or more components of the vehicle.

That is, the radome of the radar apparatus can be disposed inside of the bumper, the grille, or the body of the vehicle, or be disposed as a part of a component constituting the exterior surface of the vehicle, such as a part of the bumper, the grille, or the body of the vehicle. Therefore, the radome can improve the aesthetics of the vehicle and provide the convenience of mounting the radar sensor.

The radar sensor or the radar apparatus/system according to the present disclosure can comprise one or more of a front detection radar sensor mounted in the front of the vehicle, a rear detection radar sensor mounted in the rear of the vehicle, and a side or side-rear detection radar sensor mounted in a side of the vehicle, which can constitute at least one radar sensor subsystem.

The radar sensor or the radar apparatus/system can process data by analyzing a transmitting signal and a receiving signal, and as a result, extract information on an object. To do this, the radar sensor or the radar sensor apparatus/system can comprise an electronic or controlling circuitry ECU, or a processor. Data transmission or signal communication from the radar sensor to the electronic or control circuitry ECU or the processor can use a communication link, such as a vehicle network bus, or the like.

As described above, according to the present embodiment, in the vehicle radar apparatus including the plurality of transmission channels simultaneously transmitting transmission signals, the phase adjustment value may be determined based on the source transmission signal and the distortion transmission signal for each transmission channel, and the phase of the target detection transmission signal at the next time can be appropriately compensated.

Accordingly, the quality of the reception signal and the accuracy of the target information can be improved by removing the phase deviation of the transmission signal in the vehicle radar apparatus.

The transmitter/receiver 200, the signal processor 300, the phase correcting apparatus 400 included in the radar apparatus according to the present embodiment may be implemented as some hardware of the radar control device or some modules of an ECU. Similarly, the source transmission signal extractor 410, the distortion transmission signal extractor 420, and the phase adjustment value determiner 430, and the phase corrector 440 included in the phase correcting apparatus 400 according to the present embodiment may be also implemented as some hardware of the radar control device or some modules of the ECU.

Such a radar control device or ECU may include a processor, a storage device such as a memory and a computer program capable of performing a specific function, and the phase correcting apparatus 400 and the source transmission signal extractor 410, the distortion transmission signal extractor 420, and the phase adjustment value determiner 430, and the phase corrector 440 thereof may be implemented as software modules capable of performing respective corresponding functions.

That is, the phase correcting apparatus 400 according to the present embodiment, and the source transmission signal extractor 410, the distortion transmission signal extractor 420, and the phase adjustment value determiner 430, and the phase corrector 440 included therein may be each implemented as the corresponding software module and stored in the memory. Each software module can be executed in the processing unit such as an ECU at a specific time.

Alternatively, the phase correcting apparatus 400, and the source transmission signal extractor 410, the distortion transmission signal extractor 420, and the phase adjustment value determiner 430, and the phase corrector 440 included therein may be implemented in a structure such as a specific hardware or lines linked to the transmission/reception unit of the radar apparatus.

Figure 10:
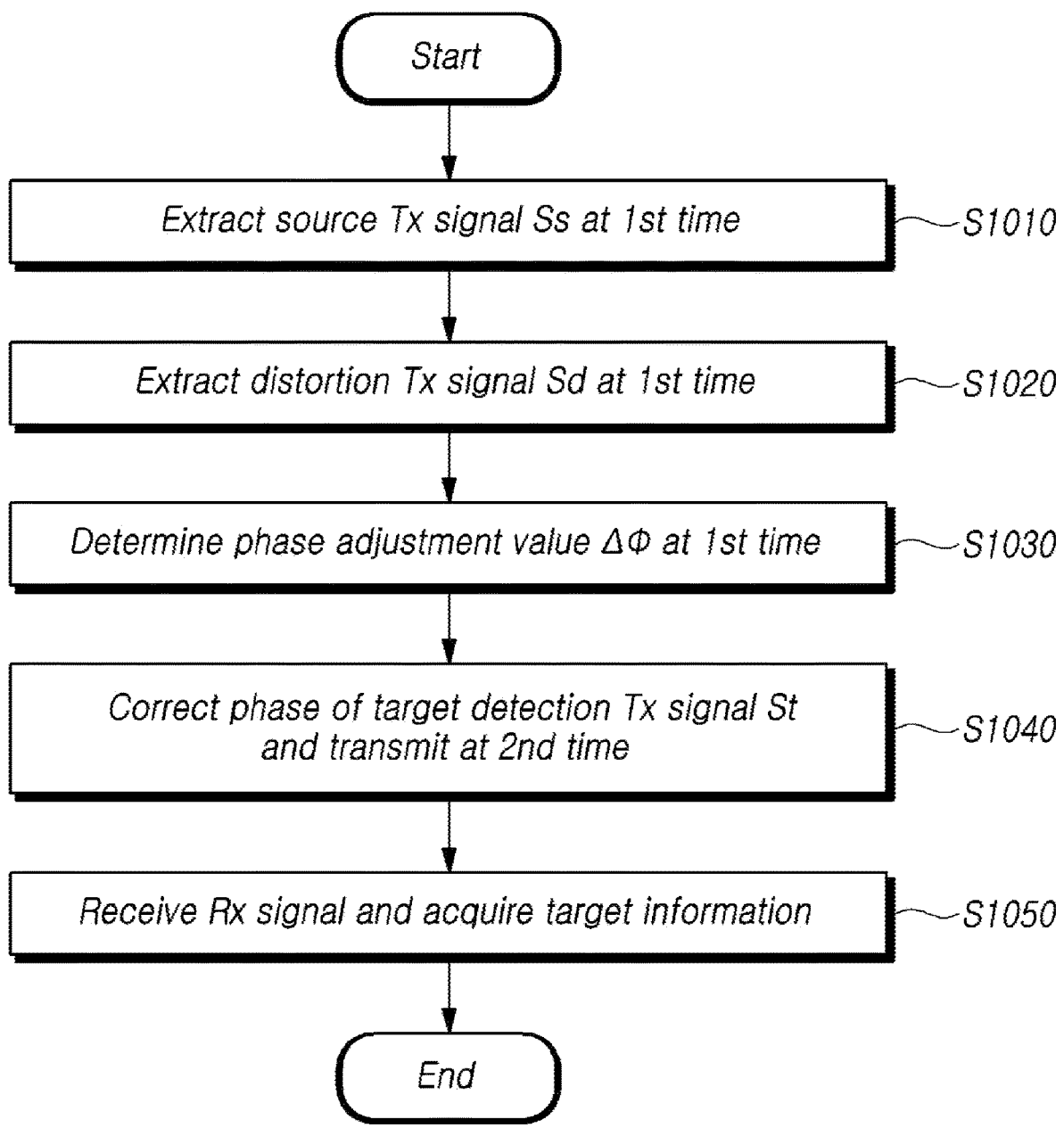
FIG. 10 is a flowchart illustrating the flow of the transmission signal phase correcting method according to the present embodiment.

FIG. 10 is a flowchart illustrating the flow of the transmission signal phase correcting method according to the present embodiment.

The transmission signal phase correcting method according to the present embodiment may be a method performed in the vehicle radar apparatus including the plurality of transmission channels simultaneously transmitting transmission signals.

As shown in FIG. 10, the transmission signal phase correcting method according to the present embodiment may include the source transmission signal extraction step (S1010) of extracting the source transmission signal as a reference signal at the first transmission time, the distortion transmission signal extraction step (S1020) of extracting the distortion transmission signal with the phase distortion at the first transmission time, the phase adjustment value determination step (S1030) of calculating the phase adjustment value based on the source transmission signal and the distortion transmission signal at the first transmission point, and the phase correction step (S1040) of correcting the phase of the target detection transmission signal using the phase adjustment value at the second transmission time following the first transmission time.

In this case, the source transmission signal may be an unmodulated signal, and the target detection transmission signal may be a frequency modulated signal.

In addition, in the phase adjustment value determination step (S1030), the phase representative value may be calculated based on the phase of the source transmission signal and the phase of the distortion transmission signal, and the calculated phase representative value may be determined as the phase adjustment value.

In addition, in the source transmission signal extraction step (S1010), the source transmission signal may be extracted from the input signal of the phase shifter included in each transmission channel of the radar apparatus, and in the distortion transmission signal extraction step (S1020), the distortion transmission signal may be extracted from the coupler included in each transmission channel of the radar apparatus.

Since such a transmission signal phase correcting method can be performed by the configuration described above based on FIGS. 3 to 9, it will be omitted a detailed description of the configuration.

Figure 11:
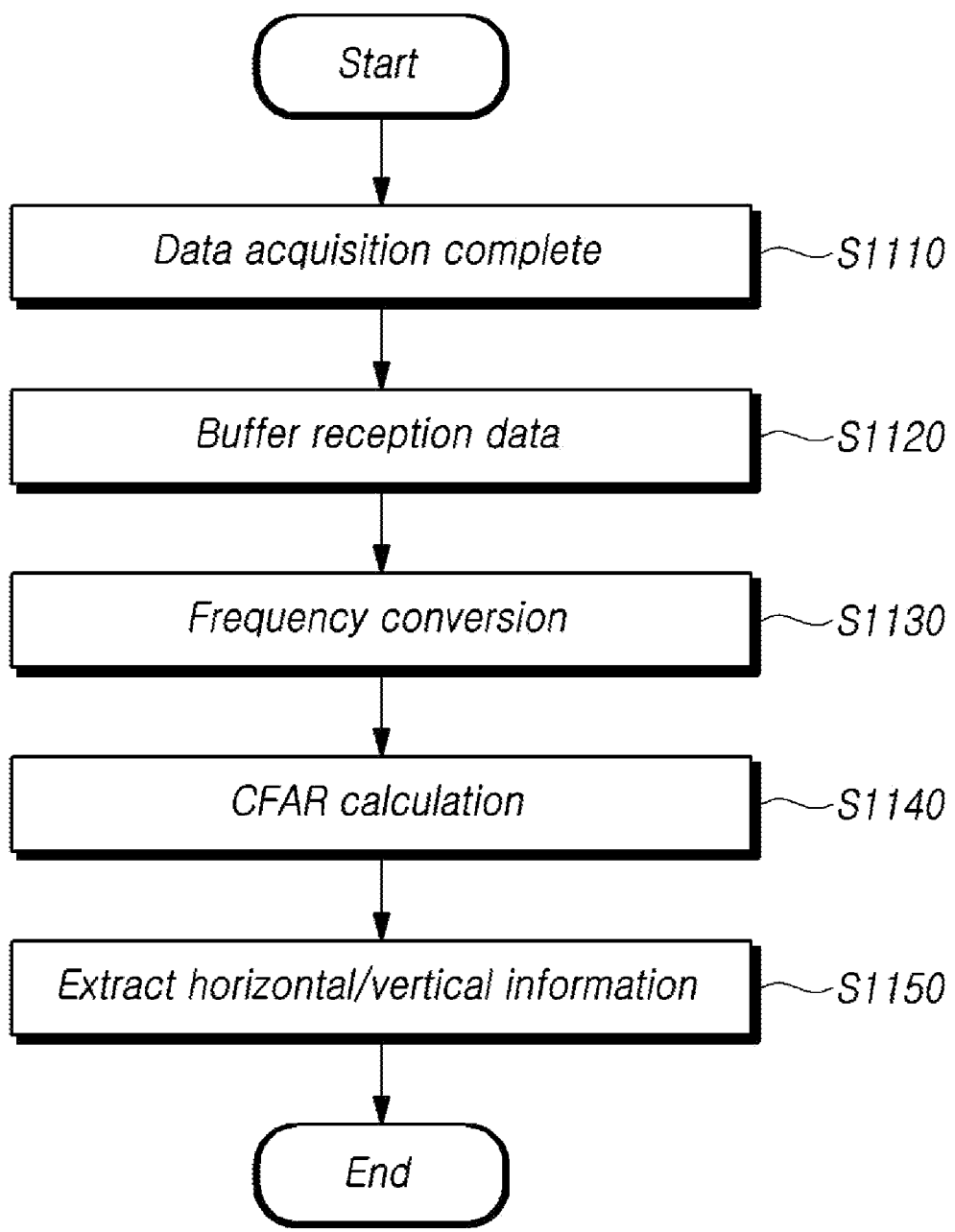
FIG. 11 is a flowchart of a signal processing method provided by the radar apparatus according to the present embodiment.

FIG. 11 is a flowchart of a signal processing method provided by the radar apparatus according to the present embodiment.

FIG. 11 is a flowchart illustrating a signal processing process after receiving the reflection signal from the target is completed. The radar apparatus may buffer the reception data obtained in the data acquisition completion step (S1110) in a unit sample size that can be processed per cycle (S1120), and then performs frequency conversion (S1130).

Thereafter, CFAR (Constant False Alarm Rate) calculation (S1140) is performed based on the frequency-converted reception data, and vertical/horizontal information, speed information, and distance information for the target are extracted (S1150). The frequency conversion in the frequency conversion step S1230 may use a Fourier transform such as a Fast Fourier Transform (FFT).

According to the present embodiment, in the vehicle radar apparatus including a plurality of transmission channels simultaneously transmitting transmission signals, the phase adjustment value may be determined based on the source transmission signal and the distortion transmission signal for each transmission channel, and the phase of the target detection transmission signal at the next time point can be appropriately compensated. Therefore, there may provide an effect of improving the quality of the reception signal and improving the precision of the target information.

It should be noted that although all or some of the configurations or elements included in one or more of the embodiments described above have been combined to constitute a single configuration or component or operated in combination, the present disclosure is not necessarily limited thereto. That is, within the scope of the object or spirit of the present disclosure, all or some of the configurations or elements included in the one or more of the embodiments may be combined to constitute one or more configurations or components or operated in such combined configuration(s) or component(s). Further, each of the configurations or elements included in one or more of the embodiments may be implemented by an independent hardware configuration; however, some or all of the configurations or elements may be selectively combined and implemented by one or more computer program(s) having one or more program module(s) that perform some or all functions from one or more combined hardware configuration(s). Codes or code segments constituting the computer program(s) may be easily produced by those skilled in the art. As the computer programs stored in computer-readable media are read and executed by a computer, embodiments of the present disclosure can be implemented. The media for storing computer programs may include, for example, a magnetic storing medium, an optical recording medium, and a carrier wave medium.

Further, unless otherwise specified herein, terms 'include', 'comprise', 'constitute', 'have', and the like described herein mean that one or more other configurations or elements may be further included in a corresponding configuration or element. Unless otherwise defined herein, all the terms used herein including technical and scientific terms have the same meaning as those understood by those skilled in the art. The terms generally used such as those defined in dictionaries should be construed as being the same as the meanings in the context of the related art and should not be construed as being ideal or excessively formal meanings, unless otherwise defined herein.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A phase correcting apparatus of a transmission signal included in a vehicle radar apparatus including a plurality of transmission channels for simultaneously transmitting the transmission signal comprising:
   a source transmission signal extractor configured to extract a source transmission signal which is a reference signal at a first transmission time;
   a distortion transmission signal extractor configured to extract a distortion transmission signal with a phase distortion immediately before being sent to a transmission antenna at the first transmission time;
   a phase adjustment value determiner configured to determine a phase adjustment value based on the source transmission signal and the distortion transmission signal at the first transmission time; and
   a phase corrector configured to correct a phase of a target detection transmission signal using the phase adjustment value at a second transmission time following the first transmission time,
   wherein the source and the distortion transmission signal at the first transmission time maintain a steady frequency and the target detection transmission signal is a frequency modulated signal.

2. The phase correcting apparatus of the transmission signal of claim 1, wherein the phase adjustment value determiner calculates a phase representative value based on the phase of the source transmission signal and the phase of the distortion transmission signal, and determines the phase representative value as the phase adjustment value.

3. The phase correcting apparatus of the transmission signal of claim 2, wherein the phase adjustment value determiner calculates the phase representative value based on the phase of the source transmission signal and the phase of the distortion transmission signal acquired from the source transmission signal at a specific temperature or a specific frequency, and determines the phase representative value as the phase adjustment value corresponding to the specific temperature or the specific frequency.

4. The phase correcting apparatus of the transmission signal of claim 2, wherein the first transmission time includes a plurality of transmission times within a period of the first transmission time, and the phase adjustment value determiner determines an average of a difference between the phase of the source transmission signal and the phase of the distortion transmission signal calculated at the plurality of transmission times as the phase representative value.

5. The phase correcting apparatus of the transmission signal of claim 1, wherein the source transmission signal extractor extracts the source transmission signal from an input signal of a phase shifter included in each transmission channel of the vehicle radar apparatus, and the distortion transmission signal extractor extracts the distortion transmission signal from a coupler included in each transmission channel of the vehicle radar apparatus.

6. A vehicle radar apparatus comprising:
a transmitter including a plurality of transmission channels for simultaneously transmitting a same transmission signal;
a receiver including a receiving antenna for receiving a reception signal reflected from a target;
a signal processor configured to process the reception signal received from the receiving antenna to acquire target information; and
a transmission signal phase correcting apparatus configured to correct a phase of a target detection transmission signal at a second transmission time by determining a phase adjustment value based on a source transmission signal extracted prior to being input into the transmitter and a distortion transmission signal extracted in a stage of the transmitter immediately before being sent to a transmission antenna at a first transmission time for each transmission channel included in the plurality of transmission channels,
wherein the source and the distortion transmission signal maintain a steady frequency and the target detection transmission signal is a frequency modulated signal.

7. The vehicle radar apparatus of claim 6, wherein each transmission channel included in the plurality of transmission channels includes a phase shifter, a coupler, and the transmission antenna, and
wherein the transmission signal phase correcting apparatus extracts the source transmission signal from an input signal of the phase shifter, and extracts the distortion transmission signal from the coupler.

8. The vehicle radar apparatus of claim 6, wherein the transmission signal phase correcting apparatus calculates a phase representative value based on the phase of the source transmission signal and the phase of the distortion transmission signal, and determines the phase representative value as the phase adjustment value.

9. The vehicle radar apparatus of claim 8, wherein the transmission signal phase correcting apparatus calculates the phase representative value based on the phase of the source transmission signal and the phase of the distortion transmission signal acquired from the source transmission signal at a specific temperature or a specific frequency, and determines the phase representative value as the phase adjustment value corresponding to the specific temperature or the specific frequency.

10. The vehicle radar apparatus of claim 8, wherein the first transmission time includes a plurality of transmission times within a period of the first transmission time, and the transmission signal phase correcting apparatus determines an average of a difference between the phase of the source transmission signal and the phase of the distortion transmission signal calculated at the plurality of transmission times as the phase representative value.

11. The vehicle radar apparatus of claim 6, wherein the transmission signal phase correcting apparatus comprises:
a source transmission signal extractor for extracting the source transmission signal at the first transmission time;
a distortion transmission signal extractor for extracting the distortion transmission signal with a phase distortion at the first transmission time;
a phase adjustment value determiner for determining the phase adjustment value based on the source transmission signal and the distortion transmission signal at the first transmission time; and
a phase corrector for correcting a phase of the target detection transmission signal using the phase adjustment value at the second transmission time following the first transmission time.

12. A phase correcting methods of a transmission signal in a vehicle radar apparatus including a plurality of transmission channels for simultaneously transmitting the transmission signal comprising:
extracting a source transmission signal which is a reference signal at a first transmission time;
extracting a distortion transmission signal with a phase distortion immediately before being sent to a transmission antenna at the first transmission time;
determining a phase adjustment value based on the source transmission signal and the distortion transmission signal at the first transmission time; and
correcting a phase of a target detection transmission signal using the phase adjustment value at a second transmission time following the first transmission time,
wherein the source and the distortion transmission signal at the first transmission time maintain a steady frequency and the target detection transmission signal is a frequency modulated signal.

13. The phase correcting method of the transmission signal of claim 12, wherein determining the phase adjustment value includes calculating a phase representative value based on the phase of the source transmission signal and the phase of the distortion transmission signal, and determining the phase representative value as the phase adjustment value.

14. The phase correcting method of the transmission signal of claim 13, wherein determining the phase adjustment value includes calculating the phase representative value based on the phase of the source transmission signal and the phase of the distortion transmission signal acquired from the source transmission signal at a specific temperature or a specific frequency, and determining the phase representative value as the phase adjustment value corresponding to the specific temperature or the specific frequency.

15. The phase correcting method of the transmission signal of claim 13, wherein the first transmission time includes a plurality of transmission times within a period of the first transmission time, and determining the phase adjustment value includes determining an average of a difference between the phase of the source transmission signal and the phase of the distortion transmission signal calculated at the plurality of transmission times as the phase representative value.

16. The phase correcting method of the transmission signal of claim 12, wherein extracting the source transmission signal includes extracting the source transmission signal from an input signal of a phase shifter included in each transmission channel of the vehicle radar apparatus, and extracting the distortion transmission signal includes extracting the distortion transmission signal from a coupler included in each transmission channel of the vehicle radar apparatus.

* * * * *